US007154383B2

(12) United States Patent
Berquist

(10) Patent No.: US 7,154,383 B2
(45) Date of Patent: Dec. 26, 2006

(54) DYNAMIC MOBILE ADVERTISING SYSTEM

(76) Inventor: Steven Earl Berquist, 7207 Frontier Trail, Chanhassen, MN (US) 55317

( * ) Notice: Subject to any disclaimer, the term of this patent is extended or adjusted under 35 U.S.C. 154(b) by 411 days.

(21) Appl. No.: 10/616,150

(22) Filed: Jul. 9, 2003

(65) Prior Publication Data

US 2005/0012598 A1 Jan. 20, 2005

(51) Int. Cl.
*B60Q 1/00* (2006.01)

(52) U.S. Cl. .............................. 340/425.5; 340/691.6; 701/200

(58) Field of Classification Search ............ 340/425.5, 340/691.6, 990, 995.1, 7.48, 988; 701/200, 701/213; 455/456; 40/597
See application file for complete search history.

(56) References Cited

U.S. PATENT DOCUMENTS

| | | | | |
|---|---|---|---|---|
| 2,816,377 | A | 12/1957 | Hastings | 40/129 |
| 3,623,254 | A | 11/1971 | Parish | 40/129 C |
| 3,631,454 | A | 12/1971 | Fields | 340/324 R |
| 4,475,299 | A | 10/1984 | Nelson | 40/591 |
| 4,953,315 | A * | 9/1990 | Romaine | 40/593 |
| 5,084,994 | A | 2/1992 | Elmer | 40/591 |
| 5,263,756 | A | 11/1993 | Gaspar | 296/21 |
| D342,971 | S | 1/1994 | Martin | D20/10 |
| D345,180 | S | 3/1994 | Martin | D20/10 |
| 5,392,549 | A | 2/1995 | Castro | 40/518 |
| 5,408,770 | A | 4/1995 | Suzuki | 30/102 |
| 5,412,892 | A | 5/1995 | Filippakis | 40/471 |
| 5,423,140 | A * | 6/1995 | Nuspl | 40/518 |
| 5,507,109 | A | 4/1996 | Rinzler | 40/603 |
| 5,588,236 | A | 12/1996 | Suzuki | 40/558 |
| 5,649,730 | A | 7/1997 | Ramos | 296/21 |
| 5,692,331 | A | 12/1997 | Tipke | 40/591 |
| 5,703,564 | A | 12/1997 | Begum et al. | 340/539 |
| 5,813,640 | A | 9/1998 | Koch et al. | 248/222.11 |
| 5,878,516 | A | 3/1999 | Amirian | 40/591 |
| 5,918,924 | A | 7/1999 | Cowan | 296/21 |
| 5,933,991 | A | 8/1999 | Gaul | 40/591 |
| 5,974,711 | A | 11/1999 | Tipke | 40/591 |
| 5,979,094 | A | 11/1999 | Brafford, Jr. | 40/590 |
| 6,079,136 | A | 6/2000 | Kozlarek | 40/591 |
| 6,098,855 | A | 8/2000 | Grabowski et al. | 224/42.2 |
| 6,108,954 | A | 8/2000 | Eiteneer et al. | 40/424 |
| 6,122,850 | A | 9/2000 | Strzeletz | 40/591 |
| 6,237,267 | B1 | 5/2001 | Lackomar | 40/593 |
| 6,250,002 | B1 | 6/2001 | Wittenberg | 40/603 |
| 6,253,476 | B1 | 7/2001 | Powell | 40/591 |
| 6,282,822 | B1 | 9/2001 | Rinzler et al. | 40/590 |
| 6,381,886 | B1 | 5/2002 | Chou | 40/209 |
| 6,393,746 | B1 | 5/2002 | Jacobson | 40/590 |
| 6,412,202 | B1 | 7/2002 | Oswood | 40/591 |
| 6,414,602 | B1 * | 7/2002 | Polyakov | 340/691.6 |
| 6,446,375 | B1 | 9/2002 | Davis | 40/375 |
| 6,542,822 | B1 * | 4/2003 | Froeberg | 701/213 |
| 6,898,517 | B1 * | 5/2005 | Froeberg | 701/207 |

* cited by examiner

*Primary Examiner*—Phung T. Nguyen
(74) *Attorney, Agent, or Firm*—Altera Law Group, LLC

(57) ABSTRACT

Disclosed herein is a vehicle mountable mobile advertising system for displaying a plurality of advertising messages. The advertising system is protected from inclement weather by a protective enclosure. The protective enclosure is provided with at least one message viewing window. The advertising display is adapted to change a displayed message based upon detected motion of the vehicle. When it is detected that the vehicle is in a traffic jam the messages being displayed change frequently. To facilitate the autonomous operation of the advertising system, the system is provided with a motion sensor. The system is also to be provided with programmable logic and memory so that a royalty stream may be developed for the messages displayed. The system is also adapted to transmit audio messages associated with displayed visual messages.

14 Claims, 8 Drawing Sheets

DYNAMIC MOBILE ADVERTISING SYSTEM

BACKGROUND OF THE INVENTION

1. Field of the Invention

This invention relates in general to mobile advertising systems, and in particular, to a vehicle mounted advertising system for displaying and changing a plurality of advertising messages or commercials without creating a hazardous distraction to surrounding traffic.

2. Description of Related Art

Providing vehicles with advertising has existed nearly as long as vehicles have existed. Owners of vehicles may generate revenue by permitting advertisements to be displayed thereon. Racing vehicles are particularly noteworthy in their extensive use of advertising on the vehicles to provide capital for financing the racing, repair and manufacture of the vehicles. Panel trucks and vans are another vehicle type frequently used for advertising. The advertising used on the majority of vehicles however is static, i.e., once applied to the vehicle it does not change. It can be quite expensive to remove the advertising or change the advertisement to advertise for a different advertiser, so the sale of such space has a limited market.

Static advertising has also been hampered because of the effects of wind and weather, which rapidly degrade the advertising signage. Dynamic advertising has become more prevalent in the last few years. Bank ATM's have begun to display advertising while consumers make transactions. Some vehicles have been modified to entertain multiple advertising messages.

If the advertising message can be easily changed, the economics of vehicle advertising will be greatly enhanced. An inherent problem with changing signage is the possible distraction posed to traffic flow as surrounding drivers may become distracted from their primary task: watching the road.

The foregoing assemblies are neither designed nor adapted to dynamically display a plurality of advertising messages while the vehicle is moving, and wherein the messages are changed dependent upon the motion and/or location of the vehicle.

It can be seen that there is a need and a market for displaying multiple messages to vehicle occupants in stopped or slow traffic. It can also be seen that there is a need and a market to provide location appropriate advertising. It can also be seen that there is a need and a market for a system that can be rapidly attached and removed from a vehicle. It can also be seen that there is a need and a market for a dynamic message display apparatus and a weather resistant enclosure for protecting the display apparatus.

SUMMARY OF THE INVENTION

To overcome the limitations in the prior art described above, and to overcome other limitations that will become apparent upon reading and understanding the present specification, the present invention discloses a vehicle mounted advertising system for dynamically displaying a plurality of advertising messages or commercials to surrounding vehicles in slow or stopped traffic.

The present invention solves the above-described problems by providing a dynamic mobile advertising system. The mobile advertising system of the present invention provides a plurality of advertisements which may be changed dependent upon the vehicle's motion, geographic location, and the appropriateness of the advertising to a specific target market.

The mobile advertising system may additionally include a motion sensing device. The motion sensing device providing information about the vehicle's instantaneous motion and duration of current motion. The motion sensing device may be operatively connected to the brake pedal or the brake system of the vehicle. The motion sensing device may also be operatively connected to the transmission or the vehicle's engine. The motion sensing device may also be operatively connected to the vehicle's microprocessor unit.

The motion sensing device may also be associated with a programmable logic unit. The programmable logic unit receiving motion specific information from the motion sensing device. The received motion information may be used to determine when to advance the displayed advertisement, select a specific advertisement for display, and record the geographic location where a specific advertisement was displayed.

The programmable logic unit may also be operatively connected to a GPS unit. The GPS unit may also be associated with a reference map stored in the programmable logic unit. The GPS location information may be adapted to comparison with the map stored in the logic unit to provide additional information concerning a targeted advertisement appropriate to a geographic location. For example, it would not be appropriate to advertise alcohol, tobacco, and adult products in close proximity to a school, church or synagogue. In affluent or high tech areas, it may be desirable to advertise high end expensive products.

A method in accordance with the principles of the present invention may include a method of dynamically displaying advertising including attaching a dynamic display apparatus to a vehicle. The method may also include providing the vehicle with a motion sensing device. The method may also include storing a plurality of advertising messages in memory. The method may also include receiving vehicle motion information from the motion sensing device. The method may also include displaying an advertising message via the display apparatus and advancing advertising messages displayed based upon vehicle motion information.

Other embodiments of a method in accordance with the principles of the invention may include alternative or optional additional aspects. One such aspect of the present invention is that the advertising messages are displayed for a predetermined amount of time based upon the vehicle motion information.

Another aspect of the present invention is that the method also includes determining advertising messages to be displayed based upon a geographic location of the vehicle.

Another method in accordance with the principles of the present invention includes a method of dynamically displaying advertising including attaching a dynamic display apparatus to a vehicle. The method also includes storing a plurality of advertising messages in memory. The method also includes displaying an advertising message via the display apparatus. The method may also include displaying another advertising message via the display apparatus based upon a motion of the vehicle. The method may also include creating a log in memory storing advertising information and determining a billing amount to charge an advertiser based upon advertising information stored in the log.

Another aspect of the present invention is that the method also includes programming a programmable logic unit to change displayed advertising messages after a predetermined period of time when the vehicle is stationary.

Another aspect of the present invention is that the method also includes programming a programmable logic unit to continuously display a selected advertising message when the vehicle is moving.

Another aspect of the present invention is that the method also includes programming a programmable logic unit to display a selected advertising message based upon population marketing information when the vehicle is located in a specific geographic location.

Another aspect of the present invention is that the advertising information stored in the log consists of at least one of a time that each advertising message is displayed, the motion of the vehicle when each advertising message is displayed, a geographic location where each advertising message is displayed, and a cumulative duration that each advertising message is displayed.

A system in accordance with the principles of the present invention includes a system for dynamically displaying advertising messages including means for dynamically displaying an advertising message attached to a vehicle, means for determining an instantaneous motion of the vehicle, and means for changing advertising messages being displayed based upon a determined instantaneous motion of the vehicle.

Another system in accordance with the present invention includes a system for dynamically displaying advertising messages including an advertising display apparatus adapted to display a plurality of advertising messages. The system may also include a protective enclosure. The protective enclosure adapted to operatively support the advertising display apparatus. The system may also include a mounting assembly attached to the protective enclosure. The mounting assembly for mounting the protective enclosure to a vehicle. The system may also include a motion sensing device operatively connected to the vehicle. The advertising display apparatus changes an advertising message being displayed based upon vehicle motion sensed by the motion sensing device.

Another aspect of the present invention is that when the vehicle is stationary, advertising messages are changed at predetermined intervals.

Another aspect of the present invention is that when the vehicle is moving at constant velocity, advertising messages are not changed.

Another aspect of the present invention is that when the vehicle is accelerating or decelerating, advertising messages are changed at predetermined intervals.

Another aspect of the present invention is that the motion sensing device is associated with a brake system of the vehicle.

Another aspect of the present invention is that the motion sensing device is associated with a drive train of the vehicle.

Another aspect of the present invention is that the system also includes a programmable logic unit for analyzing and interpreting sensed motion of the vehicle and advancing to a next advertising message display based upon analysis and interpretation of the sensed motion.

Another aspect of the present invention is that the system also includes a GPS unit and a programmable logic unit, the programmable logic unit analyzing and interpreting GPS geographic information of the vehicle and determining advertising to be displayed associated with the instantaneous location of the vehicle.

Another aspect of the present invention is that the system is mounted to a trailer hitch of the vehicle.

Another aspect of the present invention is that the system is mounted to a rear door of the vehicle.

Another aspect of the present invention is that the system is mounted to a roof of the vehicle.

Another method in accordance with the present invention includes a method of dynamically transmitting messages. The method may include displaying a visual message on a visual display apparatus attached to a vehicle. The visual message may also direct viewers to tune viewers' radios to a particular frequency. The method may also include transmitting an audio message related to the visual message on the particular frequency.

Another aspect of the present invention is that the method of transmitting messages may also include displaying a different visual message on the visual display apparatus directing viewers to tune to a different particular frequency. The method may also include transmitting a different audio message related to the different visual message on the different particular frequency.

Another aspect of the present invention is that multiple audio messages may be simultaneously transmitted on different frequencies while a single visual message is displayed.

Another aspect of the present invention is that the method of transmitting messages may also includes displaying multiple visual messages on multiple display apparatuses. Each of the multiple visual messages may be associated with an audio message transmitted on a corresponding transmission frequency.

Another aspect of the present invention is that the visual message display time may be different than audio message transmission time.

Another aspect of the present invention is that the visual message display time may be substantially identical to audio message transmission time.

Another aspect of the present invention is that the visual message being displayed may be in synch with the audio message being transmitted and initiation of the visual message and the audio message may be simultaneous.

Another aspect of the present invention is that when a first visual message being displayed changes to a second visual message being displayed, a first audio message transmitted on a first frequency corresponding to the first visual message may continue transmission while a second audio message transmitted on a second frequency corresponding to the second visual message may initiate transmission.

Another aspect of the present invention is that the method of transmitting messages may also include displaying multiple visual messages on multiple display apparatuses and at least one of the visual messages may be associated with an audio message transmitted on a corresponding transmission frequency and at least another visual message may direct viewers to tune radios to a corresponding transmission frequency associated with the at least one of the visual messages.

Another aspect of the present invention is that multiple audio messages on multiple transmission frequencies may be simultaneously transmitted, and the multiple audio messages being simultaneously transmitted may correspond to the current message being displayed and the visual messages most recently displayed.

Another method in accordance with the present invention is a method of dynamically transmitting messages which may include displaying each of a plurality of visual messages consecutively on a display apparatus attached to a vehicle. Each visual message may direct viewers to tune viewers' radios to a different transmission frequency. The method may also include transmitting a plurality of audio messages. Each audio message may be associated with a corresponding visual message and transmitted on a corresponding transmission frequency.

Another aspect of the present invention is that displaying a particular visual message may correspond to initiation of transmission of a corresponding audio message on a corresponding transmission frequency.

Another aspect of the present invention is that multiple audio messages may be simultaneously transmitted on different frequencies while a single visual message is displayed.

Another aspect of the present invention is that the method may also include displaying multiple visual messages on multiple display apparatuses. Each of the multiple visual messages may be associated with an audio message transmitted on a corresponding transmission frequency.

Another aspect of the present invention is that visual message display time may be different than audio message transmission time.

Another aspect of the present invention is that visual message display time may be substantially identical to audio message transmission time.

Another aspect of the present invention is that a visual message being displayed may be in synch with the corresponding audio message being transmitted.

Another aspect of the present invention is that when a first visual message being displayed changes to a second visual message being displayed, a first audio message transmitted on a first frequency corresponding to the first visual message may continue transmission while a second audio message transmitted on a second frequency corresponding to the second visual message may initiate transmission.

Another aspect of the present invention is that the method of transmitting messages may also include displaying multiple visual messages on multiple display apparatuses, At least one of the visual messages may be associated with an audio message transmitted on a corresponding transmission frequency and at least another visual message may direct viewers to tune radios to a corresponding transmission frequency associated with the at least one of the visual messages.

Another aspect of the present invention is that multiple audio messages on multiple transmission frequencies may be simultaneously transmitted. The multiple audio messages being simultaneously transmitted may correspond to the current message being displayed and the visual messages most recently displayed.

The foregoing objects, advantages and distinctions of the invention, among others, are obtained in a presently preferred construction that provides a dynamic mobile advertising system.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of an exemplary embodiment, reference is made to the accompanying drawings which form a part hereof, and in which is shown by way of illustration a specific embodiment in which the invention may be practiced. It is to be understood that other embodiments may be utilized as structural changes may be made without departing from the scope of the present invention.

The present invention provides a mobile advertising system for displaying a plurality of advertising messages or commercials. The mobile advertising system is adapted to be mounted to a vehicle to display advertising to surrounding vehicles in slow or stopped traffic. Although the advertising system has been disclosed adapted to be mounted to a vehicle, the advertising system may also be mounted to stationary objects such as walls, light poles, or other free-standing mounting locations.

The advertising system is protected from inclement weather by a protective enclosure. The protective enclosure may be provided with at least one viewing window where advertising messages or commercials being displayed within the protective enclosure may be viewed exterior to the enclosure.

Figure 1:
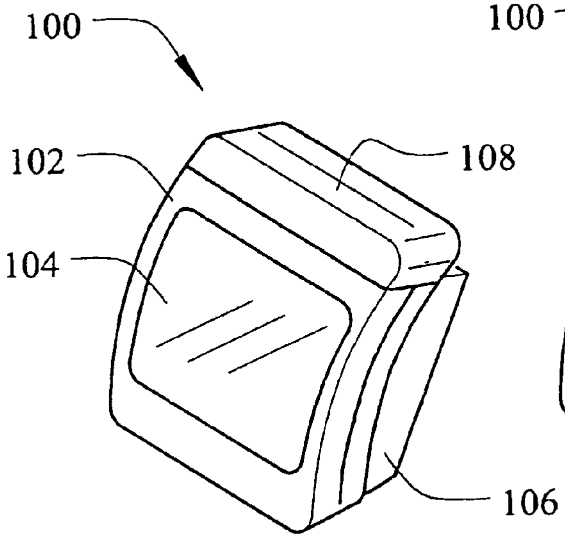
FIG. 1 illustrates a perspective view of a protective enclosure for a mobile advertising system according to an embodiment of the present invention.

FIG. 1 illustrates a perspective view of a protective enclosure 100 for a mobile advertising system according to an embodiment of the present invention. In FIG. 1, the protective enclosure is shown provided with removable cover 108, an openable front member 102 provided with a display window 104, and an extended rear member 106. The front and rear members 102, 106 and cover 108 may be fabricated from a hard plastic or lightweight metal. A rubber washer may be provided at a junction between the front member 102 and the rear member 106 to ensure a watertight seal therebetween. A rubber washer may also be provided between the junction of the cover 108 and the front and rear members 102, 106 to ensure that moisture and debris are prevented from entering the interior of the protective enclosure.

The display window 104 may be fabricated from a transparent hard plastic or glass. The display window 104 may be removable from the front member 102. A rubber washer may be provided at the junction between the display window 104 and the front member 102 to ensure a watertight moisture barrier therebetween.

Figure 2:
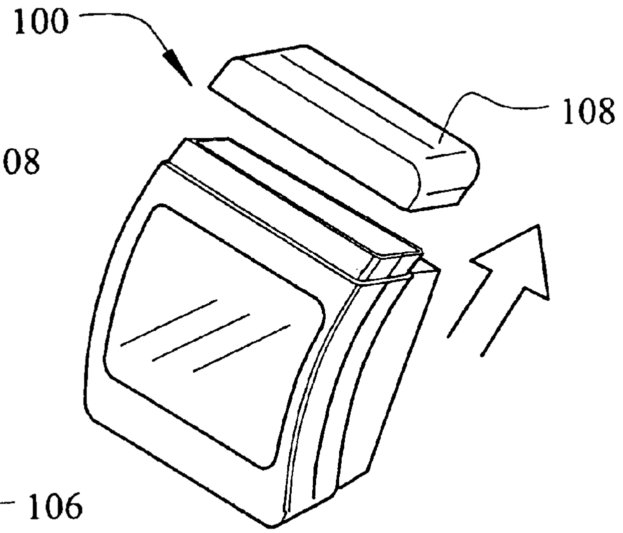
FIG. 2 illustrates removal of a cover of the protective enclosure of the mobile advertising system according to an embodiment of the present invention.

FIG. 2 illustrates removal of the cover 108 of the protective enclosure 100 of the mobile advertising system according to an embodiment of the present invention. In FIG. 2, the cover 108 is shown being removed upwardly (see arrow) from a top portion of the protective enclosure. The interface between the cover 108 and the top portion of the protective enclosure may include a complementary lip and groove attachment to provide a snap fit of the cover onto the top portion of the protective enclosure.

The cover 108 performs the function of connecting and joining the front member 102 and the rear member 106 at the top portion of the protective enclosure and maintaining the front and rear member 102, 106 in a closed watertight arrangement. The cover 108 also prevents moisture and debris from entering the interior of the protective enclosure and protecting the display apparatus contained therein.

Figure 3:
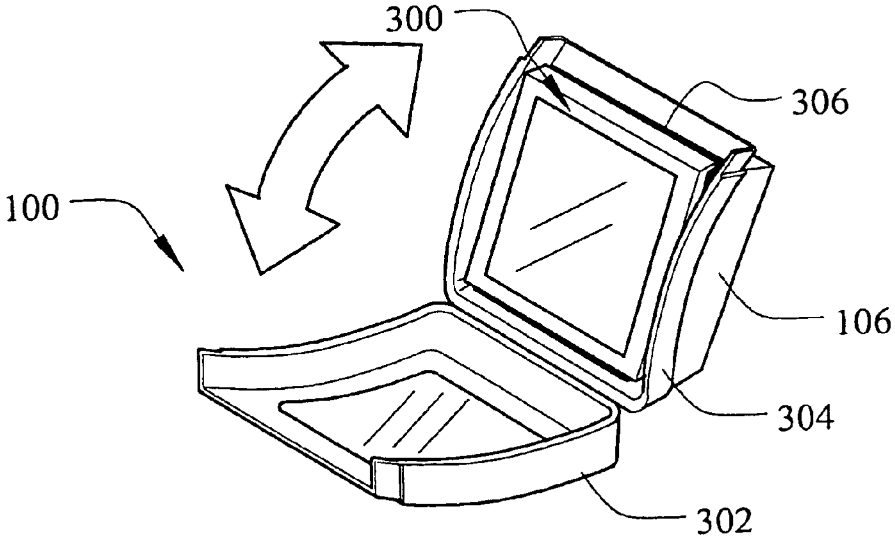
FIG. 3 illustrates the advertising display apparatus disposed in the interior of the opened protective enclosure of the mobile advertising system according to an embodiment of the present invention.

FIG. 3 illustrates the advertising display apparatus 300 disposed in the interior of the opened protective enclosure of the mobile advertising system according to an embodiment of the present invention. In FIG. 3, with the cover 108 removed from the top portion of the protective enclosure, the front member 302 and the rear member 106 are pivotally openable (see double ended arrow). The front member 102 may be joined to the rear member 106 via hinges disposed along a bottom portion of the protective enclosure or the members may also be completely separable from each other. Rear member 106 is shown provided with a complementary flange portion 304 facilitating a watertight junction between the front member and the flange portion 304 of the rear member 106. The rear member 106 may also be provided with an aperture on a rear side thereof for admitting wires for controlling and powering the display apparatus 300. Wires for delivering digital audio and video signals to the display apparatus 300 may also be provided therein. The wires may be surrounded by a rubber washer adapted to fit within the aperture and prevent moisture from entering the interior of the protective enclosure via a watertight engagement. An electrical adapter connector may also be provided on the rear side of the rear member to facilitate quick connection to a complementary connector for controlling, powering and delivering digital signals to the display apparatus 300.

The advertising display apparatus 300 is shown disposed at least partially within the extended portion of the rear member 106. The advertising display apparatus 300 may be secured via attachment to complementary connections on the display apparatus 300 and the interior of the flanged portion 304 or the extended portion of the rear member. The display apparatus 300 may be provided with a shock absorbing member 306, which may be fabricated from a foam cushion or rubber washer to prevent damage to the display apparatus from shock and rattling when the advertising system is mobile.

The advertising display apparatus may be a rolling scroll which periodically rolls to display a different exposure to the surrounding viewers. The advertising display may also be any form of electronic display, such as, a television monitor for displaying audio and video messages or commercials, a CRT, a flat screen monitor, electronically adapted thin film skins, and etc. The display apparatus may be an electronically activated thin film skin which may be placed on a flat surface of the vehicle and activated to display messages. The advertising display may also be a foldable sign system. The advertising display may also be a message display system allowing the vehicle operator to communicate with surrounding traffic by entering a message via a keyboard which is then displayed on the message display system. The messages to be played/displayed can be changed by use of the passenger's/occupant's laptop/PDA onboard the vehicle.

The advertising display may be adapted to change a displayed message based upon detected motion of the vehicle. It may be desirable to have the message being displayed not change to a different message while the vehicle is moving in traffic. However, if the vehicle is sitting at a stop sign or stoplight, it may be desirable to have the message being displayed change every few seconds. Further, if it is detected that the vehicle is in a traffic jam situation where there are numerous stops and starts and numerous slow movements, it may be desirable to change the message being displayed frequently.

To facilitate the autonomous operation of the advertising system, the system may be provided with a motion sensor, a switch operable when the brakes are activated, a switch operable in response to transmission gearing activity, a switch that measures current flowing or voltage when brake lights are applied, a pitot or pitot-static tube and/or a manometer may also be used to sense sustained airflow characteristic of movement of the vehicle (and distinguishable from ordinary wind airflow), or the system may be operated manually by the vehicle operator if desired. The preferred embodiment senses the current/voltage in the brake lights and extrapolates that information to predict when the vehicle is stopped or in slow moving traffic. A brake light "on" condition lasting at least several seconds confirms an optimal condition.

The system may be provided with programmable logic and memory. The programmable logic may be programmed to determine when a next message should be displayed. Because it is desirable to change advertising when the vehicle is stopped or moving slowly, the motion of the vehicle is continuously monitored. The system may be programmed to advance or change advertising messages when it is determined that the vehicle is motionless, for example, for 5 seconds.

Alternatively, the system may be programmed to change advertising messages when it is determined that the velocity, rate of motion, of the vehicle is slow, for example, less than 20 miles per hour, for a predetermined time, for example, 5 seconds. The velocity could be measured by the vehicles instruments, by GPS information, brake light information, or other sensors. A stopped vehicle could have display changes based upon a pre-determined time elapsed if the vehicle is stopped or parked, and/or if the vehicle engine has been turned off.

The memory may be applicable to keeping a record or log of which messages were displayed, for how long, how often, where, when, etc., so that a royalty stream may be developed for the messages displayed. The display adapter may be hard wired to the programmable logic or may communicate through RF transmissions. The system may be provided with a GPS system to record where the vehicle was when a particular message was displayed, to prevent certain messages from being displayed inappropriately, or to display target market appropriate messages when the vehicle is identified as being in a particular location. The display apparatus may be powered through the parking light circuitry of the vehicle or other available circuitry. The display apparatus may also be DC battery powered, or powered by AC power supply, as desired. GPS will also definitively provide vehicle motion, movement, and speed information.

Figure 3A:
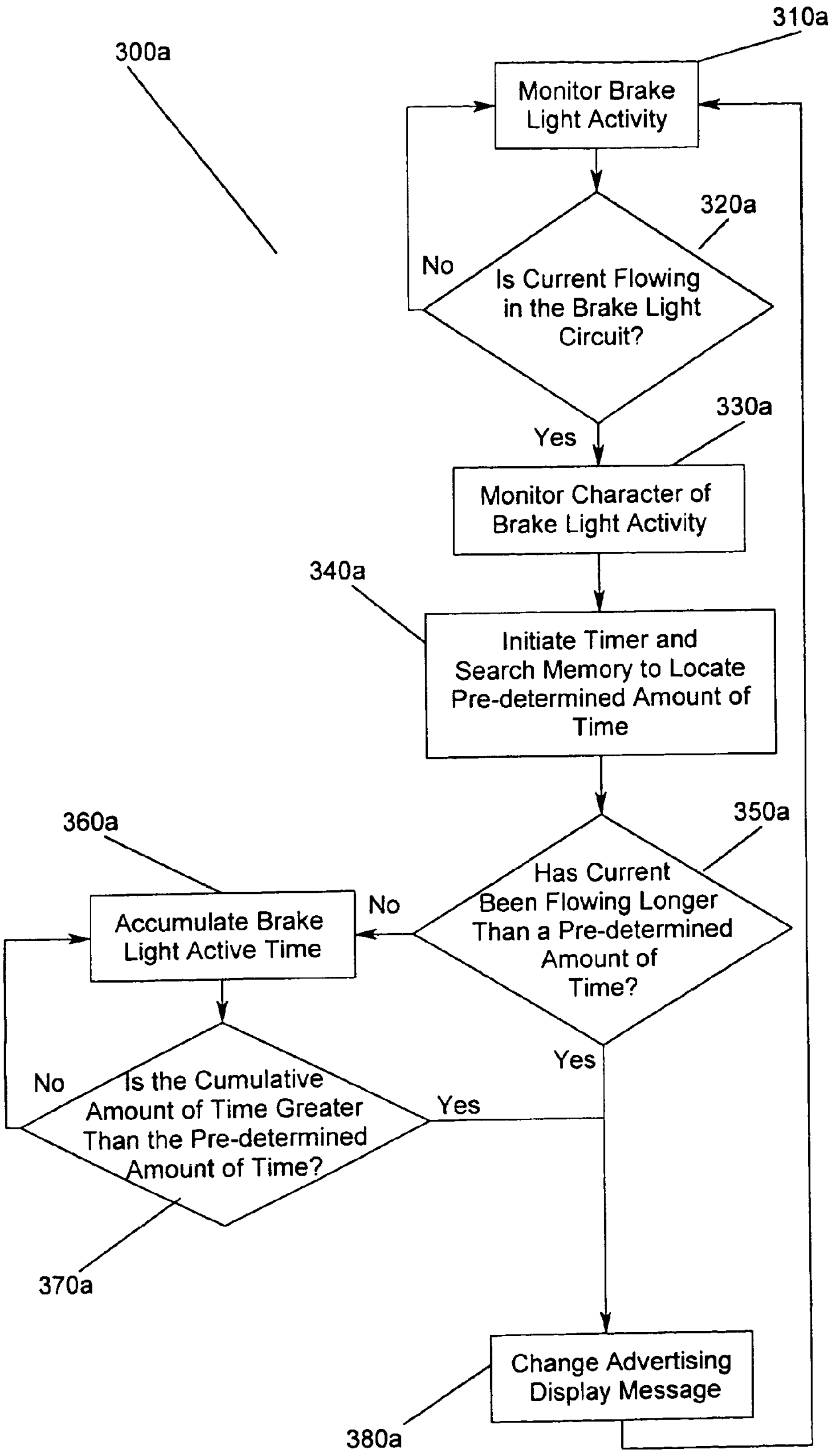
FIG. 3A is a flowchart illustrating a method of changing an advertising display message based upon a monitored brake light activity according to an embodiment of the present invention.

FIG. 3A is a flowchart 300*a* illustrating a method changing an advertising display message based upon a monitored brake light activity according to an embodiment of the present invention. In FIG. 3A, a method of changing an advertising display dynamically and autonomously is disclosed. The vehicle carrying the dynamic advertising system may be provided with a means for monitoring a current in the brake light circuitry 310*a* such as an ammeter, galvanometer or magnetic current meter. When the vehicle is driving, the programmable logic will continually be monitoring the brake light activity and determining if a current is flowing in the brake light circuit 320*a*. If no current is detected in the brake light circuit, the programmable logic continues to monitor the brake light activity.

When a current is detected in the brake light circuit, the character of the brake activity is then monitored 330*a*. Additionally, a timer is initiated to record the length of time that the current is flowing in the circuit. This corresponds to an amount of time that a vehicle operator is holding or pressing the brakes. The programmable logic also searches the memory to find a value corresponding to a pre-determined amount of time 340*a*. The programmable logic determines if the current has been flowing longer than the pre-determined amount of time 350*a*. If the current has been flowing longer than the pre-determined amount of time the advertising message being displayed is dynamically changed without any decision or even the knowledge of the vehicle operator. This generally corresponds to time when a vehicle is sitting at a stop sign or stop light.

If the current does not continuously flow longer than a predetermined amount of time, the actual time that the current flows is recorded in an accumulator or simple counter 360*a*. Each time the current flows for less than the pre-determined amount of time, the actual current flow time is sent to the accumulator. When the accumulator has accumulated enough time to exceed the pre-determined amount of time 370*a*, the advertising message being displayed is changed 380*a*. This generally corresponds to a slow traffic situation where the vehicle is intermittently stopping and starting numerous times.

Figure 4:
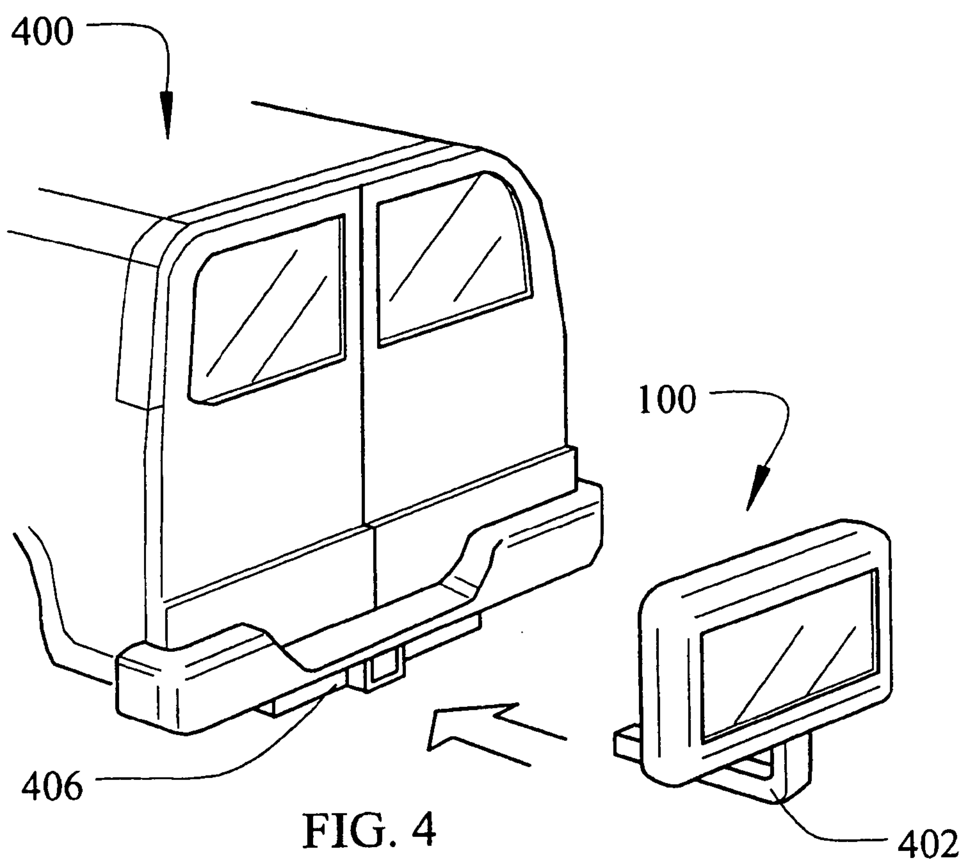
FIG. 4 illustrates the mobile advertising system being mounted to the trailer hitch of a vehicle according to an embodiment of the present invention.

FIG. 4 illustrates the mobile advertising system being mounted to the trailer hitch of a vehicle 400 according to an embodiment of the present invention. In FIG. 4, the protective enclosure 100 is shown provided with a mounting assembly 402 connected to a bottom portion thereof. The mounting assembly 402 may be adapted to be inserted into a tongue receiving aperture in a trailer hitch 406. The mounting assembly 402 may be fabricated from iron, steel or other strong composite metals.

The advertising system may be adapted to receive a trailer wiring adapter into an electrical adapter connection to power the display apparatus. A wiring harness for powering, controlling and delivering digital signals to the display apparatus may also be provided within the interior of the mounting assembly to protect the wiring from being entangled or otherwise denigrated.

Figure 5:
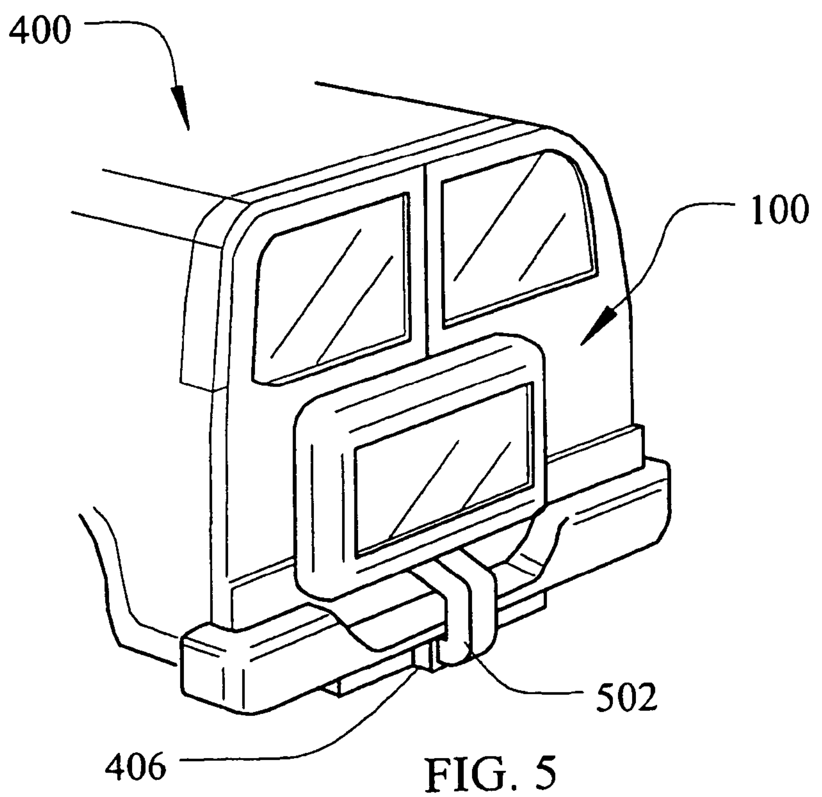
FIG. 5 illustrates the mobile advertising system being mounted to the trailer hitch of a vehicle with an alternative mounting apparatus according to an embodiment of the present invention.

FIG. 5 illustrates the mobile advertising system being mounted to the trailer hitch of a vehicle with an alternative mounting apparatus according to another embodiment of the present invention. In FIG. 5, the protective enclosure 100 is shown provided with a mounting assembly 502 connected to a bottom portion thereof. The mounting assembly 502 may be adapted to be inserted into a tongue receiving aperture in a trailer hitch 406. The mounting assembly 502 may be fabricated from iron, steel or other strong composite metals.

The mounting assembly 502 shown in FIG. 5 may also be adapted to at least partially envelop the bumper of the vehicle to locate the protective enclosure more closely to the rear of the vehicle. The mounting assembly 502 is provided with a mounting arm having a generally U-shaped portion extending from the tongue receiving opening. The mounting assembly includes a generally horizontal section, another section extending generally vertically from the horizontal section to a position above the uppermost portion of the bumper in the mounting vicinity, and another section extending generally horizontally or at some angle with respect to the horizontal. The mounting assembly 502 may also be provided with another generally vertical section adapted to be connected to the bottom portion of the protective enclosure 100.

Figure 6:
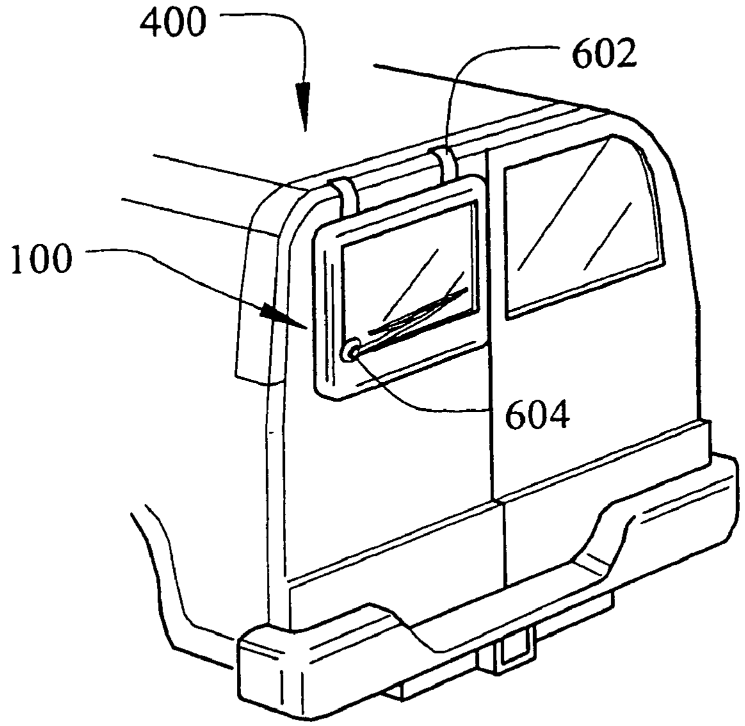
FIG. 6 illustrates the mobile advertising system mounted to a rear door of a vehicle and the protective enclosure provided with a wiping apparatus according to another embodiment of the present invention.

FIG. 6 illustrates the mobile advertising system mounted to a rear door of a vehicle 400 and the protective enclosure 100 provided with a wiping apparatus 604 according to another embodiment of the present invention. In FIG. 6, the protective enclosure 100 is provided with at least one hook shaped mounting apparatus 602 for hanging the advertising system over the top of a door of a vehicle 400. The hook shaped mounting apparatus 602 may be fabricated of metal, plastic or other strong composite materials.

The hook shaped mounting apparatus 602 may be adapted to be hung over the top of a door with the door opened, wherein when the door is shut the hook shaped mounting apparatus 602 is snugly sandwiched between the top of the door and the frame of the door. The hook shaped apparatus 602 may also be provided with a lumen for receiving a plurality of wires for controlling, powering and delivering digital signals to the display apparatus. The wires are protected within the lumen from damage when the door is shut and the wires are prevented from being entangled and denigrated. The protective enclosure 100 is shown provided with a wiper assembly 604 in this embodiment of the present invention. The wiper assembly 604 may include at least one wiper blade arm having a wiper blade attached thereto. The wiper assembly 604 may be adapted to operate when the vehicle wipers are engaged or may operate autonomously.

Figure 7:
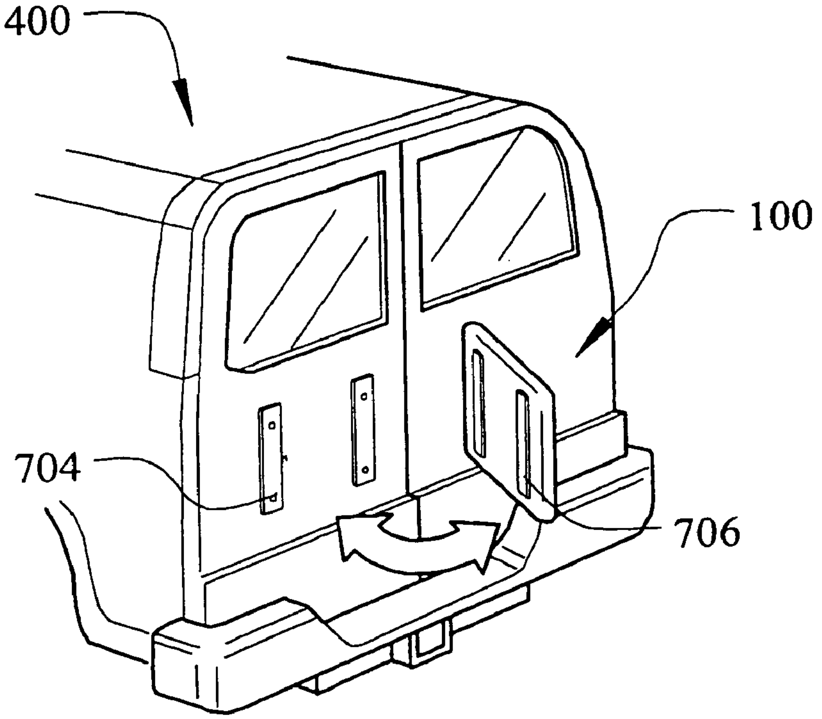
FIG. 7 illustrates the mobile advertising system mounted to a rear door of a vehicle via a complementary mounting assembly according to another embodiment of the present invention.

FIG. 7 illustrates the mobile advertising system mounted to a rear door of a vehicle 400 via a complementary mounting assembly according to another embodiment of the present invention. In FIG. 7, the protective enclosure 100 is shown having one complementary member 706 of a complementary mounting assembly provided on a rear side of the protective enclosure. The other complementary member 704 is shown mounted to the door of a vehicle 400. The complementary members 704 and 706 are adapted, when engaging one another, to securely fasten the protective enclosure 100 of the advertising system to a vehicle 400. The complementary mounting assembly may be fabricated from metal, plastic, or other strong composite materials.

The complementary members 704, 706 may also be provided with complementary electrical coupling connectors, such that when the complementary members 704, 706 engage one another, complementary electrical coupling connectors also engage one another to control, power and deliver digital signals to the display apparatus within the protective enclosure. The complementary members 704, 706 of the complementary mounting assembly may be adapted to engage one another through a hinged joining arrangement, as illustrated by the double ended arrow in FIG. 7, or may be adapted to provide that one pair of complementary members 706 slides into engagement with the other pair of complementary members 704, or the complementary members 704, 706 may include magnetically attracting materials for joining the members together.

Figure 8:
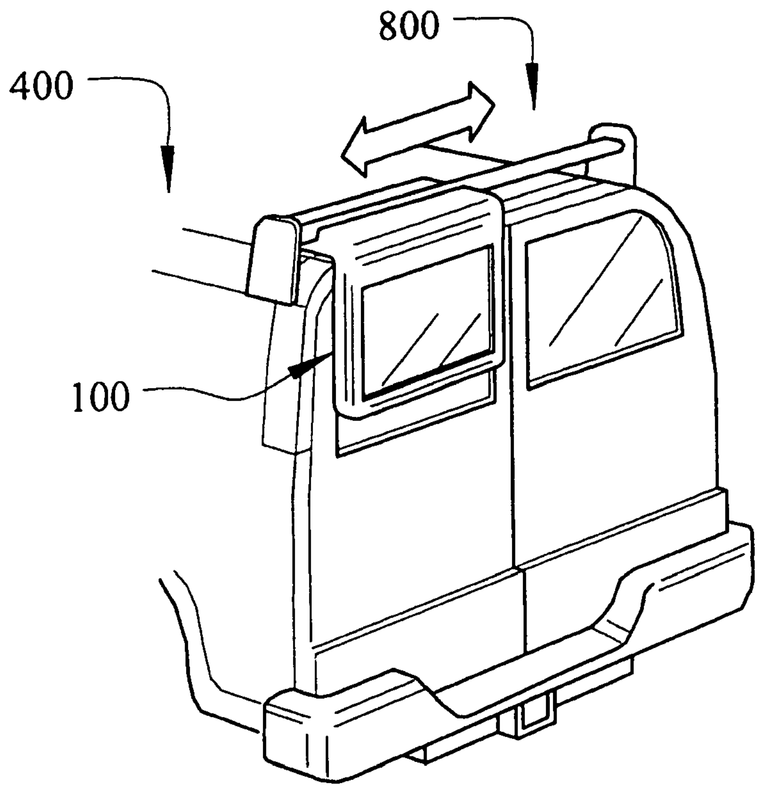
FIG. 8 illustrates the mobile advertising system mounted to the top of a vehicle via another complementary mounting assembly according to another embodiment of the present invention.

FIG. 8 illustrates the mobile advertising system mounted to the top of a vehicle 400 via another complementary mounting assembly 800 according to another embodiment of the present invention. In FIG. 8, the protective enclosure 100 is shown provided with an L-shaped arm extending horizontally from a top portion of the protective enclosure 100. The L-shaped arm is provided with a slot adapted to receive a shaft for securing the protective enclosure 100 to a vehicle 400. The shaft permits the protective enclosure 100 to be slidably moved to either side of the vehicle as desired, as shown by the double ended arrow.

Further, because the slide extends across the entire width of the vehicle, and depending upon the size of the protective enclosures and the display apparatuses therein, a plurality of protective enclosures and display apparatuses may be disposed along the rear of the vehicle and on the shaft. The complementary mounting assembly may be fabricated from metal, plastic or other strong composite materials.

Figure 9:
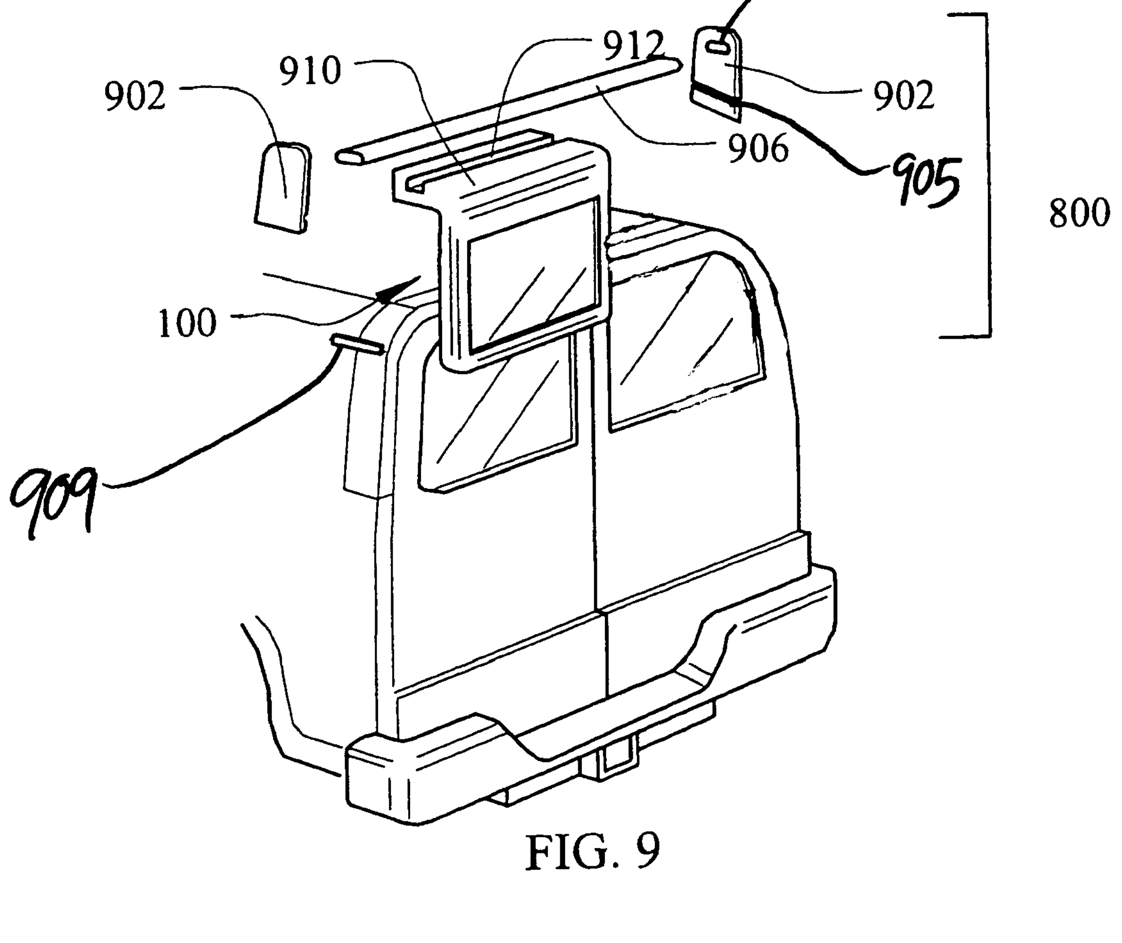
FIG. 9 illustrates an exploded view of the complementary mounting assembly for mounting the mobile advertising system to the top of a vehicle according to another embodiment of the present invention.

FIG. 9 illustrates an exploded view of the complementary mounting assembly 800 for mounting the mobile advertising system to the top of a vehicle 400 according to another embodiment of the present invention. In FIG. 9, the protective enclosure 100 is shown provided with an L-shaped arm 910 extending horizontally from a top portion of the protective enclosure 100. The L-shaped arm 910 is provided with a slot 912 adapted to receive shaft 906 for securing the protective enclosure 100 to a vehicle 400.

Along both sides of the vehicle 400, mounting brackets 902 for engaging the shaft 906 may be affixed. The mounting brackets 902 are provided with a pair of slots, including a shaft receiving slot 903 and a mounting slot 905. The mounting slot 905 is adapted for complementary engagement with a bracket detent 909 affixed to the sides of the vehicle 400. The complementary mounting assembly 800 may be fabricated from metal, plastic or other strong composite materials.

Figure 10:
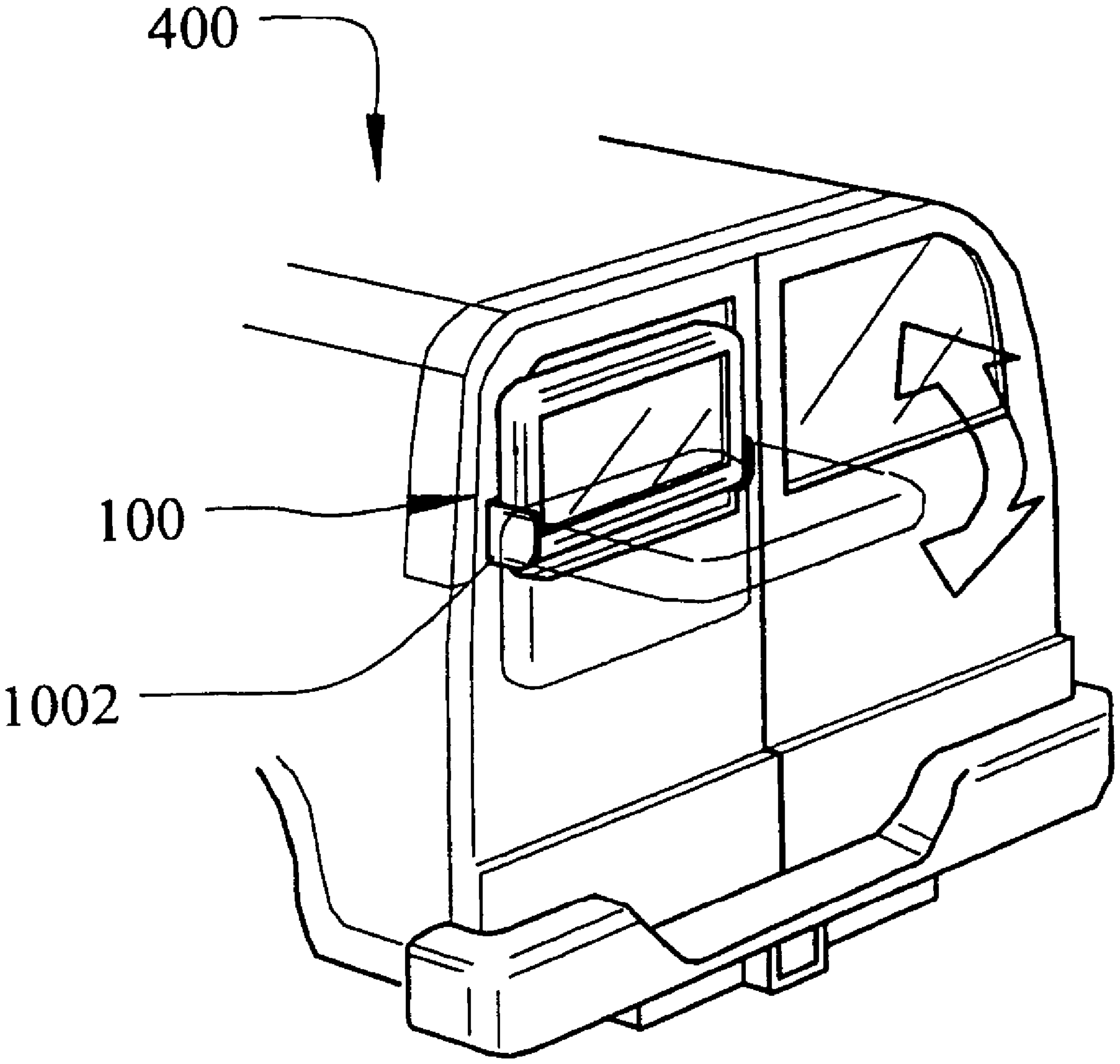
FIG. 10 illustrates the mobile advertising system mounted to a rear door of a vehicle via a pivotable complementary mounting assembly according to another embodiment of the present invention.

FIG. 10 illustrates the mobile advertising system mounted to a rear door of a vehicle 400 via a pivotable complementary mounting assembly 1002 according to another embodiment of the present invention. In FIG. 10, the protective enclosure 100 is mounted to the rear door of the vehicle 400 such that the protective enclosure 100 may be pivoted into at least three positions, as shown by the double ended arrow. In a first position, the operating position, the protective enclosure 100 is arranged such that the display window faces away from the vehicle 400 and surrounding vehicles are able to view the advertising messages or commercials.

In a second position, technician position, the display window is directed downward toward the ground. In this position, a technician may reprogram, troubleshoot or perform routine maintenance on the display apparatus. In a third position, the inoperative position, the display window is directed to face toward the vehicle. In the inoperative position, the display apparatus is turned off, and the display window is protected from exposure to debris against the rear door of the vehicle. Alternatively, the protective enclosure 100, may be adapted and mounted such that the first position, as set forth above, is the inoperative position, and the third position, as set forth above, is the operating position. An advantage to the second alternative mounting arrangement is that the rear window in the rear door is not obstructed when the display apparatus is operating.

It is also possible to couple a low power audio or video signal, preferably related to a displayed message. The signal may be a low power transmission transmitted from the vehicle adapted with the display apparatus. The transmission may include multiple transmitting channels or frequencies being simultaneously or intermittently transmitted to the region surrounding the vehicle. For example, as a message displaying vehicle is in transit between locations, the display apparatus may display a message instructing a viewer to tune his radio to a specific frequency to learn more about the message being displayed or to hear the audio associated with the displayed visual message.

The messages being displayed visually may be of shorter duration than the transmitted audio messages. When a viewer tunes to a particular frequency, the viewer will be able to listen to the message while the viewer is in transmission range of the message displaying vehicle or until the message ends. A single audio message may be transmitted on a single frequency or multiple messages, one after another may be transmitted on a single frequency. Multiple messages may also be transmitted simultaneously on multiple transmission frequencies.

A first visual message instructing a viewer to tune to a first radio frequency may last for a few seconds, whereas the associated audio message may last for a minute or more. When the first visual message changes to a second visual message (instructing a viewer to tune to a different transmitted frequency), the first audio message may still be being transmitted on the first frequency while the second audio message is being initiated on the second transmission frequency. There may be multiple audio transmissions simultaneously being transmitted, all queued at different portions of the messages.

In another embodiment, the visual display and the audio being transmitted are queued in such a way that, for example, if a person appears to be talking on the visual display, the audio being transmitted will be in synch with the visual display. A second visual display apparatus may be associated with the first display apparatus. For example, a first display apparatus may be displaying a visual message while a second visual display apparatus may direct a viewer to tune their radio to a particular frequency to hear the audio associated with the visual message being displayed.

In another embodiment, multiple visual display devices may be displaying multiple visual messages while each of multiple transmission frequencies transmit audio associated with each of the visual messages being displayed.

Figure 11:
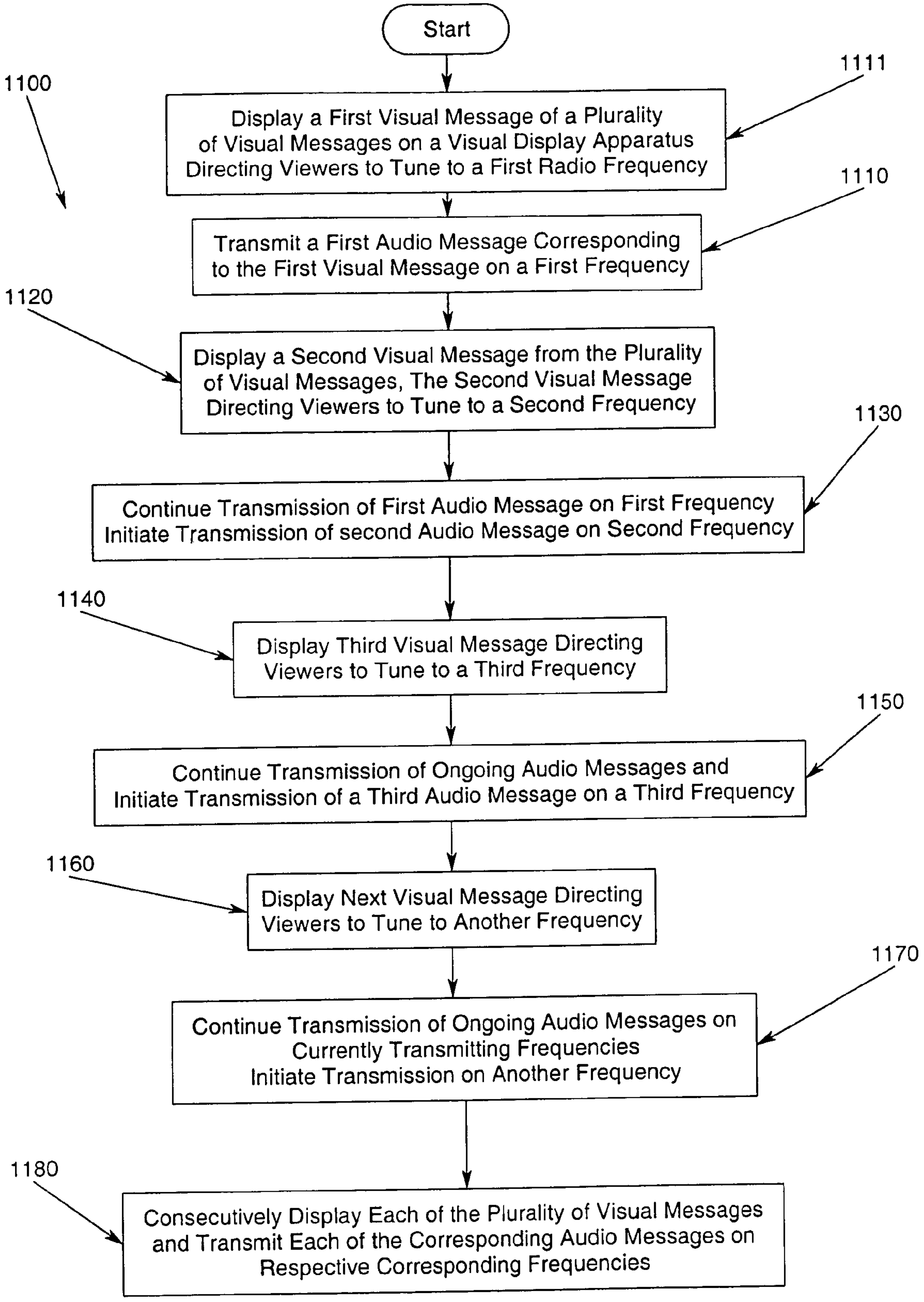
FIG. 11 is a flowchart which illustrates a method of dynamically displaying visual messages and transmitting corresponding audio messages related to the visual messages being displayed with a first display apparatus according to an embodiment of the present invention.

FIG. 11 is a flowchart 1100 which illustrates a method of dynamically displaying visual messages and transmitting corresponding audio messages related to the visual messages being displayed with a first display apparatus according to an embodiment of the present invention. After the display apparatus is mounted to the vehicle, the vehicle may begin traveling in traffic. The vehicle operator may initiate message transmission by displaying a first visual message selected from a database containing a plurality of visual messages. The visual messages may include a recorded television commercial, a public announcement, a political advertisement, product or service advertisement, or the message may be an instruction for a viewer of the message to tune their vehicle's radio to a particular radio frequency 1111, or some other type of message. The message may be displayed for several seconds or minutes depending on the movement of the vehicle and traffic conditions as set forth in the discussion above.

If the message is of the type, for example, which invites or directs a viewer to tune their radio to a particular frequency, when the viewer tunes their radio to the suggested radio frequency the viewer will receive an audio radio transmission from the message displaying vehicle selected from a database containing a plurality of associated audio messages. The transmission may be accomplished via a low power radio transmitter mounted in the vehicle and adapted to transmit a message associated with the visual message being displayed on the visual display apparatus to a region surrounding the vehicle. The transmitter may be adapted to transmit on frequencies commonly available for reception by most automobiles, such as AM/FM or "CB" citizens band frequencies, or may be adapted to transmit on frequencies requiring the viewing receivers to purchase and have installed some special receiver equipment in their vehicles adapted to receive and/or automatically tune in the transmitted audio messages.

The transmitter will transmit the first audio message selected from a database containing a plurality of audio messages corresponding to the first visual message on a first transmission frequency 1110. The radio frequencies to be transmitted upon may be selected so as to not interfere with a receiver's ability to receive local radio stations broadcasting on specific known frequencies, or frequencies adjacent other high power broadcast frequencies. Proper transmission frequency selection will also prevent interference with the low power radio transmissions being transmitted from the message displaying vehicle.

Transmission of the audio message may be initiated at the same time that the visual message is initially displayed. The visual display time may be shorter than or substantially the same as the transmitted audio message. The audio message may be the audio portion of a multimedia message, wherein the video message is displayed on the message display apparatus and the audio portion is received via the radio transmissions. The audio and video portions of the message may be in synch, i.e., if a person is talking on the video display the movements of the mouth of the speaker will correspond to the audio received. The video portion may invite a viewer to learn more about a product, service or other subject by tuning to another particular frequency, wherein the viewer, now audio receiver, hears the same or another audio message.

At some point in time, the visual message being displayed may be directed to change, as set forth in the preceding discussion, based upon movement, time, geography, and etc., for example. However, the audio transmission may not have completed. The transmitter is adapted to continue the audio portion of the message on its corresponding selected frequency until transmission is completed.

When a second visual message is displayed, transmission of a second audio message, selected from the database containing the plurality of audio messages, associated with the second visual message is also initiated, albeit, on a different transmission frequency. The second visual message may instruct or invite a viewer to tune to a second selected corresponding radio transmission frequency to receive an audio message related to and associated with the second visual message 1120. Both the first audio message transmitted on the first selected frequency and the second audio message transmitted on the second audio frequency will now be being simultaneously transmitted.

When, because of the conditions set forth in the above discussion, the visually displayed messages are being changed rapidly, or when the length of transmission of the audio messages are substantially longer than the length of display of the visually displayed messages multiple audio transmissions on multiple frequencies may be being simultaneously transmitted.

After the second visual message has been displayed, a third visual message may be displayed and a third audio transmission on a third transmission frequency will be initiated. The third visual message may direct viewers to tune their radios to the third radio frequency 1140. However, the first and second audio messages may not have completed their transmission. The transmitter is adapted to continue the first and second transmissions and initiate and transmit the third transmission 1150.

The visual display apparatus continues to display, one after another, the next visual messages which may direct viewers to tune their radios to other different frequencies 1160. Transmission of any ongoing audio messages are continued on their corresponding frequencies in use until completed and transmission of different frequencies may be continuously initiated each time the visual display changes 1170. Eventually the plurality of visual messages will all be displayed and a plurality of corresponding audio messages will be ending transmission, in continuing transmission, or in an initiated transmission state on the corresponding transmission frequencies 1180. At this time, the first displayed visual message may once again be displayed and the procedure may start over and repeat. The visual messages and corresponding audio transmissions may be displayed/transmitted in a particular order or they may be selected randomly. The visual messages and corresponding audio transmissions may be categorized in a database by geographic location such that messages displayed/transmitted are appropriate to a particular viewing/receiving audience or categorized based upon other predetermined factors.

Figure 12:
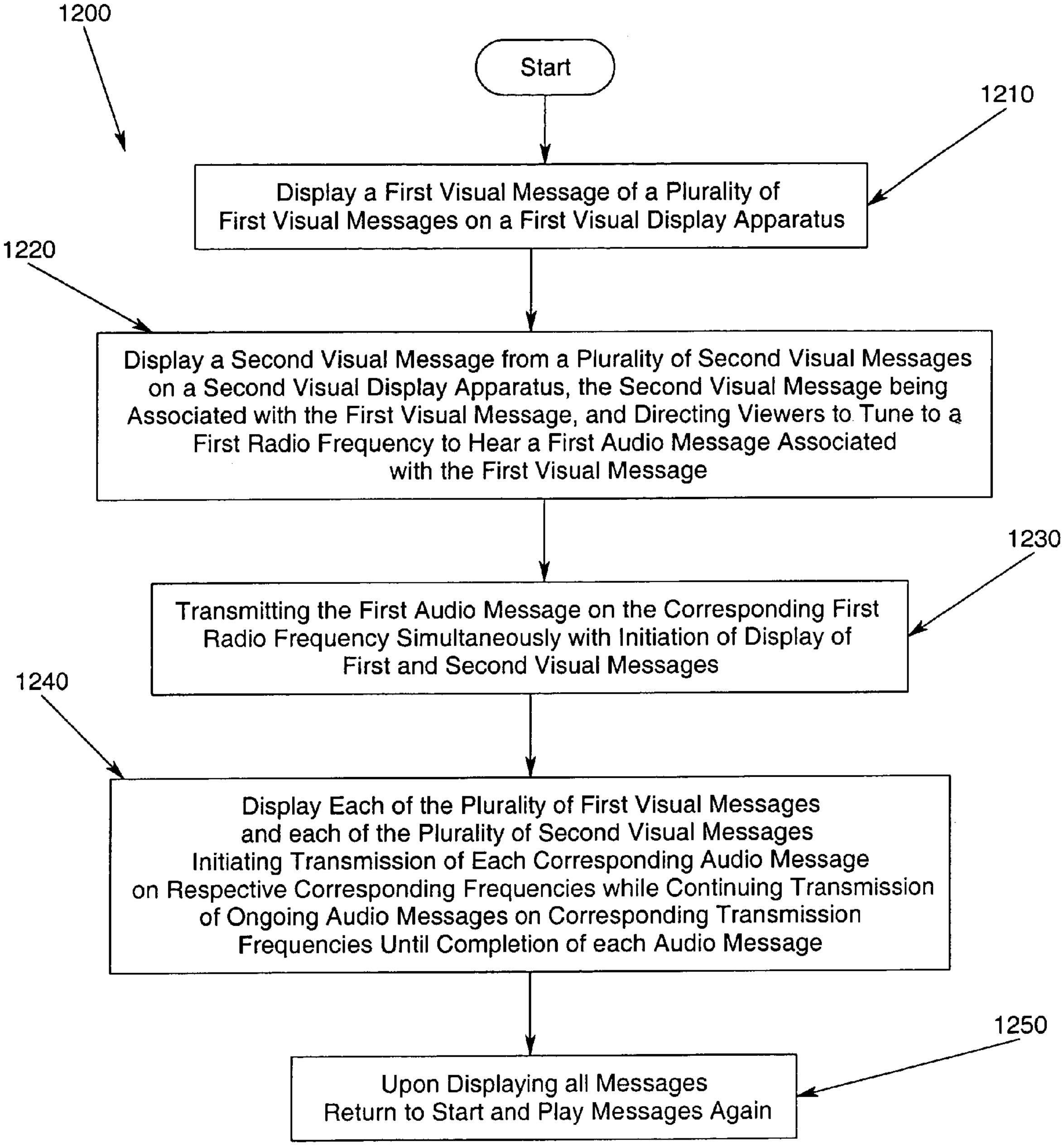
FIG. 12 is a flowchart which illustrates a method of dynamically displaying visual messages and transmitting corresponding audio messages related to the visual messages being displayed with first and second display apparatuses according to an embodiment of the present invention.

FIG. 12 is a flowchart 1200 which illustrates another method of dynamically displaying visual messages and transmitting corresponding audio messages related to the visual messages being displayed with first and second display apparatuses according to an embodiment of the present invention. After first and second display apparatuses are mounted to the vehicle, the vehicle may begin traveling in traffic. The vehicle operator may initiate message transmission by displaying a first visual message selected from a database containing a plurality of first visual messages on the first visual display apparatus 1210.

In conjunction, with the display of the first visual message on the first display apparatus, a second visual message selected from a database containing a plurality of second visual messages may also be displayed on a second display apparatus. The second visual display message may be associated with the first visual display message. For example, the first visual display message may be a recorded video or other multimedia visual message, and the second visual message may be a visual message inviting or directing a viewer to tune their radio to a first particular transmission frequency to facilitate receiving the audio portion of the first visual message broadcast as set forth above 1220.

Alternatively, the second visual display message may be unrelated to the first visual display and may display a message which invites a viewer to tune to a different radio frequency to receive a different audio message than that which is suggested in the first visual message being displayed.

The first and second visual messages and the audio messages may be displayed/transmitted as set forth in the discussion above.

The transmitter will transmit the first audio message on the corresponding radio frequency simultaneously with initiation of display of the first and second visual messages 1230. The message display and transmission system is adapted to consecutively or randomly display each of the plurality of first visual messages simultaneously or at different times with each of the plurality of second visual messages. The system is also adapted to initiate transmission of each consecutive or random corresponding audio message on respective corresponding frequencies while continuing transmission of ongoing audio messages on their respective corresponding transmission frequencies until completion of each audio message 1240. The system is also adapted to display all the messages in the selected databases and then begin the either consecutive or random display/transmission again 1250.

The foregoing objects, advantages and distinctions of the invention, among others, are obtained in a presently preferred construction that provides a dynamic mobile advertising system.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method of dynamically displaying advertising comprising:

attaching a dynamic display apparatus to a vehicle;

storing a plurality of advertising messages;

displaying an advertising message via the display apparatus;

providing the vehicle with a brake light monitoring device;

monitoring the electrical activity of the vehicles brake lights;

determining that the vehicle is substantially stationary from monitored brake light electrical activity; and advancing advertising messages displayed when the vehicle is determined to be substantially stationary.

2. The method of displaying advertising according to claim 1, further comprising displaying advertising messages for a predetermined amount of time when the vehicle is determined to be substantially stationary.

3. The method of displaying advertising according to claim 1, further comprising determining a billing amount to charge an advertiser based upon advertising information stored in the log.

4. The method of displaying advertising according to claim 1, further comprising programming a programmable logic unit to change displayed advertising messages after a predetermined period of time when the vehicle is stationary.

5. The method of displaying advertising according to claim 1, further comprising programming a programmable logic unit to continuously display a selected advertising message when the vehicle is moving.

6. The method of displaying advertising according to claim 1, further comprising programming a programmable logic unit capable of retrieving demographic data correlated with a current location and to display a selected advertising message appropriate to the demographics when the vehicle is located in a specific geographic location.

7. The method of displaying advertising according to claim 1, wherein the display of advertising information is logged to track at least one of the following: the advertising message being displayed, the location of the vehicle when each advertising message is displayed, a geographic location that each advertising message is displayed, and a cumulative duration that each advertising message is displayed.

8. A method of dynamically displaying advertising comprising:

attaching a dynamic display apparatus to a vehicle;

storing a plurality of advertising messages;

displaying an advertising message via the display apparatus;

providing the vehicle with a brake light timing device;

monitoring a time that the vehicle brake lights are deployed;

determining that the vehicle is substantially stationary from monitored brake light deployment time; and advancing advertising messages displayed when the brake light deployment time is determined to be longer than a predetermined brake light time.

9. The method of displaying advertising according to claim 8, further comprising displaying advertising messages for a predetermined amount of time when the brake light deployment time is determined to be longer than a predetermined brake light time.

10. The method of displaying advertising according to claim 8, further comprising determining a billing amount to charge an advertiser based upon advertising information stored in the log.

11. The method of displaying advertising according to claim 8, further comprising programming a programmable logic unit to change displayed advertising messages after a predetermined period of time when the vehicle is stationary.

12. The method of displaying advertising according to claim 8, further comprising programming a programmable logic unit to continuously display a selected advertising message when the vehicle is moving.

13. The method of displaying advertising according to claim 8, further comprising programming a programmable logic unit capable of retrieving demographic data correlated with a current location and to display a selected advertising message appropriate to the demographics when the vehicle is located in a specific geographic location.

14. The method of displaying advertising according to claim 8, wherein the display of advertising information is logged to track at least one of the following: the advertising message being displayed, the location of the vehicle when each advertising message is displayed, a geographic location that each advertising message is displayed, and a cumulative duration that each advertising message is displayed.

* * * * *